UNITED STATES PATENT OFFICE.

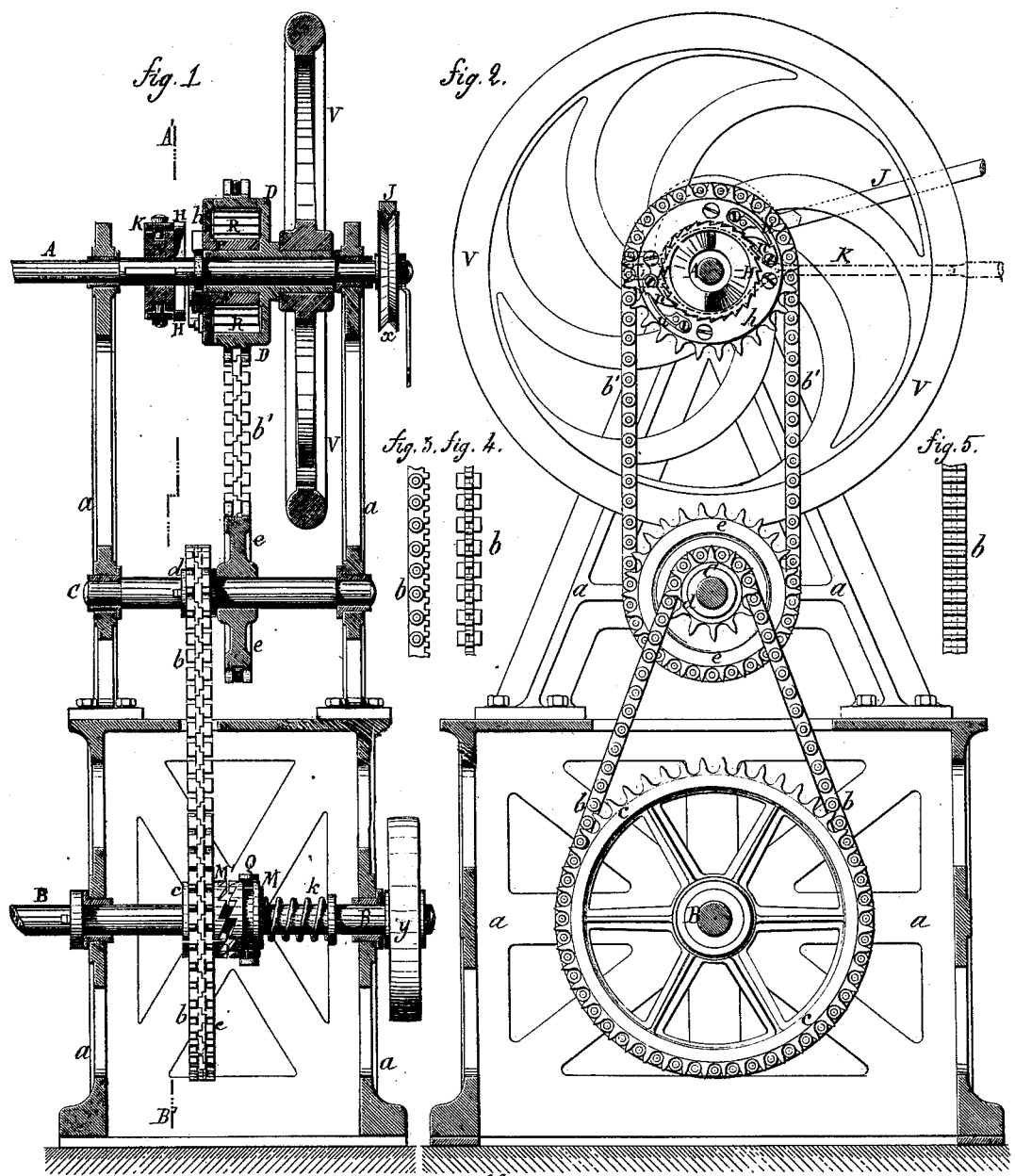

CLAUDE D. GOUBET AND JEAN N. MONROCQ, OF PARIS, FRANCE.

IMPROVEMENT IN MACHINERY FOR TRANSMITTING MOTIVE POWER.

Specification forming part of Letters Patent No. 175,074, dated March 21, 1876; application filed December 15, 1875.

*To all whom it may concern:*

Be it known that we, CLAUDE DÉSIRÉ GOUBET and JEAN NOËL MONROCQ, of Paris, France, have invented Improved Machinery for Transmitting Motive Power, of which the following is a specification:

The invention which forms the subject of the present application for a patent makes a radical change, and at the same time effects a great improvement, in the plans of factories and works, in so far as regards the transmission of motive power from an engine or prime mover to all the machines, apparatus, and tools which it drives.

Our mode of transmission differs from that generally followed, by means of driving-belts, in four chief points, upon which our invention is based. These are, first, a chain for the transmission of power, consisting of a succession of links, each formed with a stud upon the end, and each link connected to another by a pintle through the corresponding stud of the two; second, the fitting of the fly-wheel of each machine or tool loosely on its shaft, instead of keying it thereto, so as to render the fly-wheel quite independent of the machine, the working of which it regulates at the moment the machine stops, which can thus be done absolutely instantaneously; third, the driving of each tool or machine through the intermediation of a spring-clutch mounted loosely on the tool or machine shaft, so as to prevent shocks at the time of putting into work; fourth, the introduction of ratchets on the driving-shaft at the point where it transmits the motive power to the tool, with the object of enabling the latter to profit by the sudden motions which accelerations of speeds of the prime motor tend to give it, and for disengaging instantaneously the driving-shaft from the tool-shaft or fly-wheel shaft.

The brake is mounted on the fly-wheel or tool shaft, so as to regulate or moderate at pleasure the speed of the rotation of this shaft, or for stopping the same.

It is upon these data, (which may be applied conjointly or separately,) and to realize in the most advantageous manner the conditions incident thereto, that the apparatus and devices for transmitting power which we now proceed to describe are constructed.

Figure 1 of the annexed drawings is a cross-section elevation, and Fig. 2 is a lateral section, (made by the line A' B' on Fig. 1,) of an apparatus constructed according to this invention, for transmitting motive power to drive a tool or machine. Figs. 3, 4, and 5 represent a peculiar arrangement of our chain, formed with teeth, so as to transmit motion. The teeth formed on the back of the said chain differ, according to whether they should act as a pinion, Figs. 3 and 4, or as a rack, Fig. 5.

In most cases the adoption of our invention will render—if not compulsory—at least decidedly preferable, the placing of the driving-shaft under the floor, instead of, as usual, overhead, and the application we are about to explain is to a machine with the driving-shaft so placed. In the annexed drawings the apparatus is mounted on a frame affixed to the floor, the driving-shaft crossing through the frame *a*. The main shaft A of the machine to be driven, is shown in Figs. 1 and 2 as situated in the same vertical plane as the driving-shaft B; but it is clear that its position may be more or less out of that vertical plane, according to circumstances, and these two shafts communicate together by an intermediate shaft, C, in the following manner: The movement of the driving-shaft B is transmitted to the intermediate shaft C by the means of chain *b* gearing with a great-toothed pulley, *c*, of the shaft B, and with a little-toothed pulley, *d*, on the shaft C, the same shaft C having another toothed pulley, *e*, which communicates with the toothed drum D, mounted on the shaft A, by a chain, *b'*, similar to the chain *b*. These chains, which are of iron, or preferably of steel, are made in a special manner, of which Figs. 3, 4, and 5 represent two modifications. Each link consists of a flat shank, connected at each end to a knob, which has a cylindrical hole formed transversely through it. The two knobs may be placed at opposite sides, Fig. 1, or both at one side of the shank, and the shank may be straight-sided or otherwise. The several links are joined together by placing the end of one against the end of the next, and then uniting the two by a pin or rivet, which is passed through their cylindrical holes, and then clinched into countersinks formed at the edges of the holes. The fitting of the rivets is as tight as possible, but sufficiently free not to interfere with the play of the joint necessary in the chain as it bends in passing over a pulley and again straightens. Other forms of links made on the same principle may be used—for example, a link in the form of a fork, with knobs placed symmetrically at the same end of the shank, and the same width apart as the shank, so as to receive the shank of the next link. The chain-pulleys $c$ $d$ $e$ have the form of a gear-wheel, with a square groove in the middle of the felly or rim. The shanks of the links lodge in the groove, while the knobs, with their internal rivets, engage in the spaces or hollows of the two toothed cheeks. Each knob is thus held between two consecutive teeth, in the sides of which, either at the entry or at the exit, it finds a point of support, which considerably diminishes the work of the rivet. The rivet, not being in direct contact with the pulley, has only to resist drawing strains. It receives no shock at the time of the change of form of the chain, and is thus removed from all cause of wear, which so soon deteriorates the kinds of chains now in use, such as those in which the pin or pivoting-axis bears directly upon the rim of the pulley. The toothed chain-pulleys $d$ and $e$, for the chains $b$ $b'$, are keyed on the shaft C. The driving-pulley $c$ is fitted freely on the shaft B, with which it is connected by a clutch or engaging apparatus. The toothed drum D is also fitted freely on the shaft A by means of an engaging apparatus.

We will proceed to describe the construction and action of these clutching apparatus. The fly-wheel V has its nave or center keyed on the socket or sleeve of the toothed drum D. It follows that the fly-wheel is, as the drum, fitted freely on the shaft A. The principal advantage of this novel arrangement is, that the fly-wheel is rendered independent of the machine, and detached therefrom at the moment the machine should stop working. Within or in the inside of the drum D is lodged a spring, R, formed of a band of steel, which is hooked or attached at one end to the rim of the drum D, and at the other end to a clutch, F, by a dovetail joint. The opening of the drum opposite the plate is closed by a cover, $h$, carrying two pawls or clicks, $n$ $n$, for acting on the same teeth of a ratchet, H, fixed to a collar, N. This collar has a groove to receive the fork of a clutch-lever, K. The nave of this collar is keyed on the shaft A, so that it can slide freely toward the clutch F. The collar N has two catches, as the clutch F.

For greater clearness we have shown in Fig. 1 the parts in the positions they respectively occupy when disengaged. To put the parts into gear it is sufficient to push the coupling box or collar N, with the clutch or ratchet H, by means of the forked lever K, Fig. 2, so that it engages with the other clutch, F. The two clutches thus turn together; but before their rotation can be communicated to the drum it is necessary for the spring R to wind up, so as to present a resistance equal to that of the power to be transmitted. It is only from this moment that the drum, with its nave, and consequently the shaft A, participates in the rotation of the chain-wheel and fly-wheel. The tension of the spring R is produced very quickly; this very rapid action is sufficient to diminish the shocks at the time of putting the machine into work.

During the working of a machine or tool, the resisting power often varies between considerable limits. These variations would necessitate alternations of tension and slackening of the spring, and would consequently occasion injurious shocks if we had not interposed the play of the ratchet H and pawls $n$ $n$, which prevent the spring slackening. As long as the power to be transmitted increases, the pawls allow the spring to wind up, and they ride freely over the ratchet-teeth; but as soon as the power diminishes, the pawls, being engaged between the teeth, where they are pressed by their springs $u$ $u$, prevent the unwinding of the spring by locking its return movement.

The object of the mechanism we have just described is to make the transmission of the motive power very smooth and regular. There remains, however, to prevent the tool or machine partaking of quick or sudden movements, caused by the engine running fast, and to take advantage of these accelerations of speed. We obtain this result by a ratchet arrangement on the driving-shaft B. This ratchet mechanism is composed of a ratchet-toothed clutch, M, keyed on the driving-shaft, along which it can slide, being constantly pushed in one direction by a coiled spring, $k$. This clutch acts on a similar clutch, $M^1$, formed on the nave of the chain-pulley $c$. Then the driving-shaft receives from the prime mover an accelerated impulse, the clutch M transmits it to the chain-pulley $c$, and from that to the machine, the speed of which gains several turns over that of the driving-shaft. During this differential rotation, the clutch $M'$ on the chain-pulley $c$ of the driving-shaft B clears several teeth of the clutch M, which moves therefrom by compressing its spring $k$; but as soon as the prime mover, and consequently the driving-shaft, have returned to their normal place, this clutch M, pushed by its spring, regains the opposite clutch $M'$, and will only quit it again when there is a fresh acceleration of speed. The driving-pulley $c$ is mounted loosely on its shaft B, where it is maintained laterally by two rings. It can be connected with the shaft, either on the one side by the toothed clutch M, which is operated by a forked lever, Q, or on the other side by a friction-plate.

In addition to the clutching apparatus before described, we can fit a brake on the tool-shaft A. This brake consists of a grooved pulley, $x$, keyed on the shaft A, and a lever J. This brake serves either for regulating or moderating the speed of the tool-shaft, or for stopping this shaft.

Figs. 3, 4, and 5 are sufficient to explain the use of our improved chains, when made with teeth on the back or outer edge, for the purpose of transmitting rotary motion. When the chain acts as a pinion (see Figs. 3 and 4) the breadth of teeth is only equal to that of the shank of each link, and they are spaced irregularly on the chain, so as to present the desired angular intervals when the chain is bent round to gear with a pinion. The teeth of the chain, when it is intended to act as a rack, occupy the whole breadth of the chain. They are hollowed underneath, to allow the teeth of the guide-pulleys to pass. The teeth are formed only on one part of the chain, in order to transmit an intermittent rotation to a pinion.

Our invention applies not only to machines and tools, but also to the engine itself, for working the driving-shaft. The large fly-wheel of the engine is loose on its shaft, which novel peculiarity, by allowing of the instantaneous stoppage of all transmission, and of all the machines in the factory or works, will prevent many accidents. In this case the driving-shaft will receive the motive power by means of an intermediate chain passing over a toothed pulley keyed on the shaft B, instead of the usual pulley y, Fig. 1.

The large fly-wheel will only be in action when its use is required—that is to say, during the transmission of power the speed of which it ought to regulate. In order to facilitate the putting of the engine itself into work, it will be well to have a small additional fly-wheel keyed on its shaft. Frequently the intermediate shaft C will be omitted, and the one chain, b, will pass directly from the driving-shaft B over the tool-shaft A.

We do not wish to be understood as broadly claiming a chain composed of a succession of links for transmitting motive power, as such we are aware is not new.

We claim—

1. The herein-described chain for transmitting motive power, consisting of a succession of links, each link constructed with a knob or stud projecting at right angles from each end, parallel with the axis of the wheel around which the chain runs, and successive links, connected together by a pintle through corresponding studs, substantially as described.

2. The fly-wheel of machines or tools mounted loosely on its shaft A, and fitting it on a socket or sleeve of the drum D, which carries the driving-pulley, and forms a clutch, substantially as hereinbefore described.

3. The combination of the loose drum D on the shaft A, the wheel V, fast on a sleeve of the said drum, the spring R within the said drum, one end of which is in connection with the shaft, and the other with a loose drum, and a clutch, substantially such as described, for engaging the said drum with the said shaft through the said spring, substantially as described.

4. The ratchet H and pawls n n, for preventing the said spring slackening, as hereinbefore described.

5. The ratchet mechanism on the driving-shaft B, for allowing the machine to make an advance when the engine races or suddenly increases its speed, or to disengage from the driving-shaft, substantially as hereinbefore described.

In testimony whereof we have signed our names to this specification before two subscribing witnesses.

C. D. GOUBET.
J. N. MONROCQ.

Witnesses:
ROBT. M. HOOPER,
ARMENGAUD, Jeune.